March 28, 1939.  A. R. WILLIAMS  2,152,123
AUTOMATIC VEHICLE CONTROL SYSTEM
Filed Dec. 17, 1937
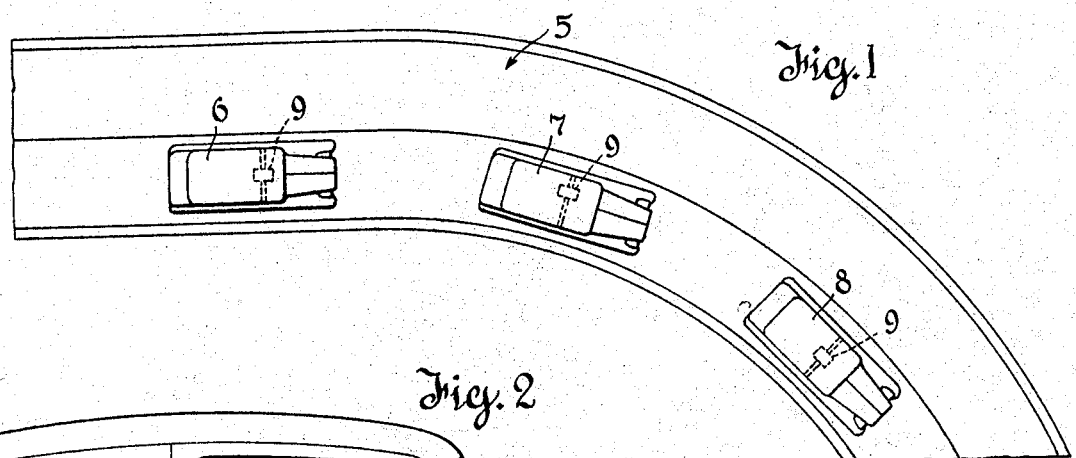
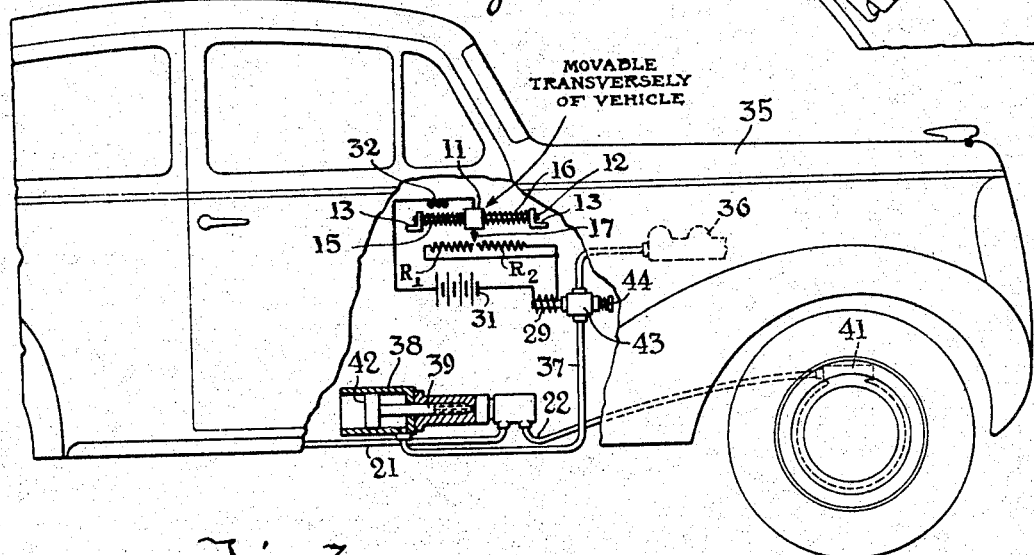
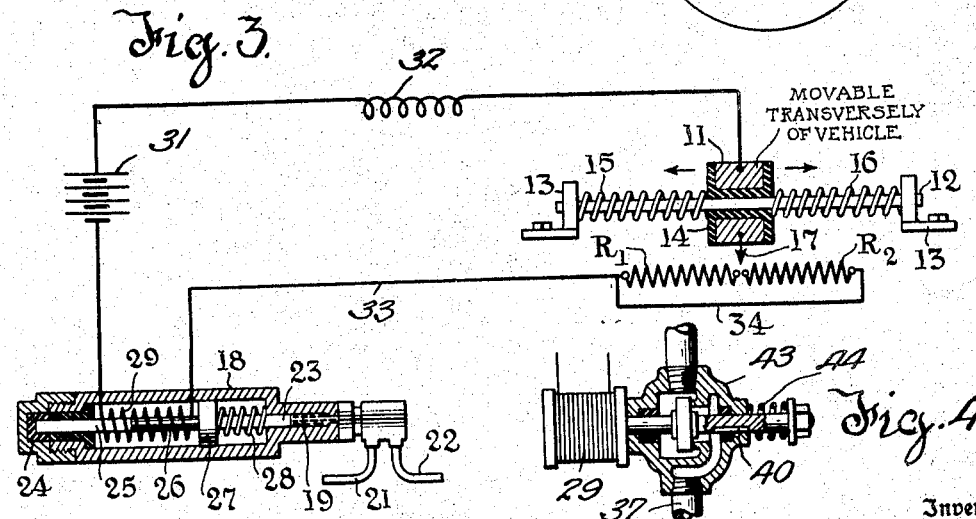
Inventor:
Allison R. Williams
By
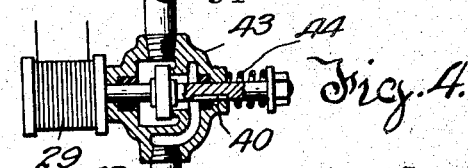
Attorneys Patented Mar. 28, 1939

2,152,123

UNITED STATES PATENT OFFICE 2,152,123

AUTOMATIC VEHICLE CONTROL SYSTEM

Allison R. Williams, Yazoo City, Miss.

Application December 17, 1937, Serial No. 180,443

16 Claims. (Cl. 188—152)

This invention relates to the art of vehicle control and particularly to the control of vehicles by means mounted on the vehicle to be controlled and responsive to turning movements of that vehicle. More particularly, the invention concerns the automatic control of vehicles so that their control mechanism is automatically responsive to dangerous conditions without requiring a physical reaction on the part of the vehicle operator. The invention will be understood more clearly if the description of the mechanism to be used is prefaced by a discussion of a few of the more common situations to which it may be applied.

The control of automotive vehicles on highways and in cities where congested traffic is encountered is dependent upon two things; first, the physical reaction of the driver of the vehicle to various stimuli arising in the course of operation, and second, the mechanical devices incorporated in the vehicle and under the driver's control. The physical reactions of the driver cannot be standardized because they are dependent upon the health, state of mind, and general psychological make-up of the individual. The dexterity with which instinctive manual control is carried out, and the speed with which the driver reacts to an emergency are wholly beyond the scope of either a mechanical robot or of any automatic control device. The mechanical controls of the vehicle itself are capable of rigid standardization and can be relied upon to operate efficiently at all times, provided they are properly actuated by the driver.

It is the purpose of this invention to eliminate the human element as much as possible in the control of dirigible vehicles and particularly automotive vehicles on highways and in congested traffic.

When a vehicle is moving at high speed along a thoroughfare, a sudden turning movement of the steering wheel of the vehicle may result in overturning that vehicle. Overturning or tendency to overturn may also result from a too fast approach to or passage around a curve. Dangerous conditions may arise either from the actions of the driver of the vehicle or from the relation of that vehicle to other vehicles traveling in a lane of traffic. It is, therefore, important to prevent vehicle movements which will have a tendency to overturn such vehicle or to create a dangerous condition affecting the movement of the vehicle.

It is a main object of this invention to prevent vehicles traveling along a thoroughfare from making too sudden or too short turning movements when the vehicle speed is such as to make the movements dangerous. It is also an object of the invention to prevent vehicles from traveling too fast around a curve, and to provide means whereby the vehicle brakes are automatically applied in response to improper lateral movements of the vehicle, and to graduate such brake applications in accordance with the severity of the conditions encountered. While the mechanism herein shown and described is intended primarily to affect a vehicle without respect to other vehicles in its proximity, it may, under certain conditions, be desirable to have brake applications made in response to movements of the vehicle when it attempts to turn abruptly out of a lane of traffic and circle around vehicles ahead, particularly when the lane of traffic is moving around a curve.

This application constitutes a continuation-in-part of my application Serial No. 139,816, filed April 29, 1937, in which an automatic vehicle control method and apparatus for carrying it out are described and claimed. While the parent application discloses and claims broadly, vehicle control performed automatically, it also claims control by wave motion energy. The present application relates to automatic control by means responsive to inertia effects, particularly in response to turning movements of a vehicle of any character and amount sufficient to create a dangerous traffic condition.

The control of vehicles according to the present invention will be understood more fully from a reading of the following description in connection with the accompanying drawing in which:

Figure 1 is a diagrammatic plan view of a highway possessing a sharp turn, and with vehicles moving in line along said highway;

Fig. 2 is a side elevation of a portion of a typical passenger-carrying automotive vehicle with parts broken away to show portions of one form of automatic control mechanism which may be embodied therein, according to the present invention;

Fig. 3 is a complete diagrammatic view of the automatic controlling device which is responsive to inertia effects on the vehicle due to the turning movements of the vehicle, but including a modification of the brake actuating equipment of Fig. 2; and Fig. 4 is a sectional view of the controlling valve shown in Fig. 2.

While the inventive concept herein set forth may take numerous forms, for purposes of illustration two forms only have been illustrated. In Fig. 1 of the drawing the reference character 5 designates a roadway having a straight-away portion and a curve. Along this roadway is a line of traffic in which the individual cars are equipped with control apparatus embodying this invention. For example, the car 6 is traveling in a straight line along the straight portion of the thoroughfare. Car 7 is starting around the curve at too high a speed and at a speed sufficient to cause a brake application by the control mechanism on the vehicle. Car 8 is passing around the curve at a safe speed within such limits that the control mechanism does not produce a brake application.

Brake applying device 9 associated with each of these vehicles is shown in ineffective (central) position on the vehicles 6 and 8, but in effective position on car 7 where it is displaced from the center to produce a brake application.

The mechanism 9 is mounted transversely of the vehicle which it controls, and is capable of transverse movement on that vehicle to produce brake applications whenever turning or sidewise movements of the vehicle are sufficiently abrupt to introduce a lateral component of dangerous character. The parts are so adjusted that movement of the controller mechanism does not occur under normal driving conditions and during ordinary turning movements of the car necessary for steering and maintaining control of the same. Upon turning movements tending to produce a dangerous condition, a graduated control of the braking mechanism in response to the control mechanism is contemplated, so that the intensity of brake application varies with the condition which produces it. In other words, the present invention contemplates an automatically responsive brake application which will, by applying the brakes, warn the driver of improper action on his part, but will only produce a severe brake application when emergency conditions arise.

Before describing in detail how the control mechanism is applied to the vehicle, the structure of that mechanism will be described in connection with Fig. 3 of the drawing, which is a diagrammatic view showing the principles of the invention. In Fig. 3, reference character 11 designates an inertia device such as a weight mounted on guide rod 12. The guide rod 12 is disposed transversely of the vehicle as shown in Fig. 1 and is supported by suitable brackets or supports 13. The weight 11, as shown, is electrically conducting and is insulated from the rod 12 by insulation 14. Springs 15 and 16 bias the weight to a central position under conditions requiring no brake application, and in this position the electrical contact 17, carried by the weight, is out of engagement with resistances $R_1$ and $R_2$. Predetermined movement of the weight 11 in either direction from the center brings contact 17 into engagement with one or the other of the resistances $R_1$ or $R_2$ to control the circuit of the brake applying means. As here shown, this brake applying means includes electromagnetic means in the form of a solenoid actuated valve 18 adapted to operate and bring about a brake application whenever the contact 17 engages either of the resistance elements $R_1$ and $R_2$, the occurrence of a brake application depending upon the amount of movement of contact 17 with respect to those elements. For example, as contact 17 moves to the right in Fig. 3 and engages the resistance element $R_2$, it progressively cuts out resistance from the control circuit of the winding of solenoid valve 18 and in its extreme right-hand position all of the resistance $R_2$ would be cut out. Inasmuch as movement of the weight 11 toward the right is resisted by spring 16, it will be clear that the operation of solenoid valve 18 is determined by the extent of movement of the weight 11 and upon the degree of energization of the solenoid valve.

The valve 18 contains a chamber 19 for hydraulic fluid and is in connection with lines 21 and 22 of the brake applying mechanism which will be described later. A master plunger 23 movable in the chamber 19 serves to apply pressure to the brake applying fluid and may cause brake applications in accordance with the intensity of energization of the valve. The plunger 23 is extended to the left-hand end of the valve casing from which it is insulated at 24. The portion 25 of this rod is of magnetic material, whereas the portion 26 is of non-magnetic material. A collar 27 mounted on the rod guides the rod in its movement, and the plunger 23 is biased to its extreme left-hand position, as shown, by a spring 28.

Within the valve 18 is a winding 29 which, when energized, moves the plunger 23 to the right to apply the brakes. When the winding is de-energized, spring 28 restores the parts to the positions shown in Fig. 3. The winding 29 receives its energy from a suitable source, such as a battery 31 having one of its terminals connected to the winding 29, and the other connected to device 11 through a flexible lead 32. Winding 29 is connected by lead 33 to one end of resistance $R_1$. A branch wire 34 connects the right hand end of resistance $R_2$ with the wire 33. Consequently, it will be seen that when the weight 11 moves either to the right or left a predetermined amount from the position shown in the drawing, contact 17 engages one of the resistances $R_1$ or $R_2$. If the movement is, for example, toward the left, the circuit of winding 29 is completed through the resistance $R_1$. The degree of energization of winding 29 will depend upon the extent of movement of weight 11, consequently upon the amount of resistance of $R_1$ which is included in the circuit, the resistance being progressively cut out as the weight moves toward the left.

Fig. 2 shows a modified form of apparatus installed in a vehicle. In Fig. 2, reference character 35 designates generally an automotive vehicle having the usual propelling and hydraulic braking equipment, and including an internal combustion engine having an intake manifold 36. While in Fig. 3 the brake actuating mechanism is illustrated as being of the electro-magnetic type, this mechanism may be of the vacuum type shown in Fig. 2 and operated as will now be described in connection with the illustration of Fig. 2.

The intake manifold 36 is connected by pipe 37 with a vacuum operated hydraulic brake cylinder 38 having a master plunger 39 for applying pressure to the hydraulic fluid and forcing it through lines 21 and 22 to suitable brake operators associated with the wheels of the vehicle. In the drawing, only one of these operators 41 is shown in connection with the vehicle wheel connected up with the line 22. The suction line 37 from the intake manifold 36 is connected to a chamber within the brake cylinder 38 in front of piston 42. The rear end of the cylinder 38 is open to atmosphere, consequently piston 42 will be moved to the right to compress the hydraulic fluid whenever the space on the right of the piston 42 is subjected to vacuum, and will be restored when the pressure on the right of piston 42 is equal to atmosphere.

The vacuum line 37 between the intake manifold 36 and the vacuum cylinder 38 is controlled by a solenoid valve 43 of suitable construction. This valve, a detail of which is shown in Fig. 4, is biased to closed position by a spring 44, but may be opened against the action of that spring by solenoid winding 29 controlled by inertia mechanism of the type already shown and described in Fig. 3. When the valve is closed as shown, in pipe 37 and the space to the right of piston 42 in cylinder 38 is open to atmosphere through groove 40 in the valve stem to cause release of the brakes. Opening the valve blanks the groove 40 and permits evacuation of cylinder 38 through pipe 37 to apply the brakes. Inasmuch as the inertia control mechanism of Fig. 2 is the same as that of Fig. 3, it will be sufficient to state that movement of the inertia weight 11 transversely of the vehicle will cause graduated movement of this weight and, consequently, varied energization of winding 29 in accordance with the extent of movement of the weight. In other words, extreme movement of weight 11 in either direction will cause strong energization of winding 29, tending to open the valve 43 fully and cause a heavy brake application. Less severe movement of weight 11 will cause a smaller movement of valve 43 and, hence, a less severe brake application. Consequently, it will be clear that regardless of the details of the mechanism, whether it be of the character illustrated in Fig. 2 or of that illustrated in Fig. 3, brake applications may be produced in accordance with the severity of the condition met in service.

The operation of the complete mechanism of Fig. 2 is briefly as follows: When the vehicle is proceeding in a straight line or approximately so, and at a safe speed which has no tendency to overturn the vehicle, the parts will occupy the positions shown in the drawing. If the driver of the vehicle, however, makes a sudden swerve sufficient to create a dangerous tendency to overturn the vehicle, the weight 11 will move away from the center onto resistance $R_1$, for example, the extent of that movement being dependent upon the lateral component of centrifugal force applied to the weight 11 by such turning movement. The contact 17 will then complete a circuit through the resistance $R_1$ and apply the brakes with an intensity depending upon the amount of resistance which is cut out of the circuit by the movement of the weight. The brake application will persist until the effect of the turning movement has disappeared by a reduction in the rate of vehicle movement within safe limits, or by stopping it so that the spring 15 restores the weight to the position of Fig. 2 in which the brakes will be entirely released.

It will be clear that the operation just described will take place regardless of whether the turning movement be to the right or to the left. Energization of the winding 29 in response to this movement of course controls the vacuum to which the piston 42 is subjected and, hence, the application of the brakes by atmospheric pressure acting upon this piston 42. When the winding 29 is de-energized, spring 44 restores the valve 43 to closed position, thereby permitting the restoration of the piston 42 to the position of Fig. 2, wherein the brakes are released.

The operation of the mechanism shown in Fig. 3, when applied to a vehicle, will be similar to that just described except that the winding 29 controls the brake applying mechanism directly rather than through a vacuum cylinder. Consequently, the operation depends upon the extent of movement of weight 11, in producing response of valve 18.

It will be understood that the weight and its opposing springs may be designed and proportioned to respond in any desired manner and to any predetermined force; likewise that the weight 11 and resistances $R_1$ and $R_2$ may be proportioned for response to fit any conditions encountered in service. The scope of this invention is, therefore, not limited to the precise details set forth but is capable of wide variations. While the control system has been illustrated as being applied to the braking system of the vehicle, it will be understood that it may also control other control elements in combination with the braking mechanism or separately. The primary purpose of the device is to provide automatic means for controlling vehicles regardless of what the particular mechanism or type of brake relied on may consist of.

What is claimed is:

1. The combination with a dirigible vehicle having a braking system, of a power means for energizing said system; and automatic means responsive to lateral movement of said vehicle for rendering said energizing means effective under predetermined conditions.

2. The combination with a dirigible vehicle having braking means thereon, of power means for actuating said braking means; and inertia means responsive to lateral movement of said vehicle for controlling the operation of said actuating means.

3. The combination with a dirigible vehicle having a braking system thereon, of power means for actuating said system; an inertia device responsive to a lateral component of movement of said vehicle; and means responsive to predetermined movement of said inertia device for causing said power means to become effective to operate said system.

4. The combination with a dirigible vehicle, of braking means on said vehicle; an inertia device capable of movement transversely of said vehicle; electric controlling means responsive to movements of said device; and a brake actuating valve responsive to said electric controlling means.

5. The combination with a dirigible vehicle having an hydraulic braking system, of a master control means for said system; electric means for actuating said master control means; an inertia device capable of movement transversely of said vehicle; spring means for opposing such transverse movement; and electric contact means carried by said inertia device and capable of causing energization of said electric means to move said master control means and apply the brakes whenever a predetermined character of movement of said inertia device occurs.

6. The combination with a dirigible vehicle having a braking system, of an inertia device responsive to lateral components of movement of said vehicle; electric means controlled by said inertia device for actuating the brakes whenever the inertia device is subjected to movement of a predetermined character; and spring means for biasing said device to ineffective position at all times when the vehicle is not subjected to said predetermined character of movement.

7. The combination with a dirigible vehicle having a braking system, of an inertia device responsive to lateral components of movement of said vehicle; means for biasing said device to ineffective position; electrically responsive means for causing operation of said braking system; a source of electric current; a pair of resistance elements in circuit with said means and said source; and an electric contact device actuated by said inertia device for completing an electric circuit through one or the other of said resistance elements whenever said inertia device executes a predetermined movement.

8. The combination with a dirigible vehicle, of braking means on said vehicle; an inertia device movable transversely of said vehicle; and electric means energized proportionally to the extent of movement of said device for producing graduated operation of said braking means.

9. The combination with a dirigible vehicle having a braking system, of an inertia device responsive to lateral components of movement of said vehicle; means for biasing said device to ineffective position; electrically responsive means for causing operation of said braking system; a source of electric currents; a pair of resistance elements in circuit with said means and said source; an electric contact device actuated by said inertia device whenever it moves away from its ineffective position in response to lateral movement of the vehicle; and means for causing the braking system to be operated in proportion to the extent of movement of said device.

10. The combination with a dirigible vehicle having hydraulic braking means including a master cylinder having a plunger therein, of inertia means movable transversely of said vehicle in response to lateral components of movement of the vehicle; electromagnetic means for actuating the plunger in the master cylinder; and means responsive to movement of said inertia device for controlling the energization of said electromagnetic means.

11. The combination with a dirigible vehicle having hydraulic braking means including a master cylinder having a plunger therein, of inertia means movable transversely of said vehicle in response to lateral components of movement of the vehicle; vacuum means for actuating the master plunger to control the braking means; and electrical means responsive to movement of the inertia device for controlling said vacuum means.

12. The combination with a dirigible vehicle having hydraulic braking means including a master cylinder having a plunger therein, of inertia means movable transversely of said vehicle in response to lateral components of movement of the vehicle; electromagnetic means for actuating the master plunger to control the braking means; and electrical means responsive to movement of the inertia device for controlling said electromagnetic means.

13. The combination with a dirigible vehicle having braking means thereon, of power means for actuating said braking means; and inertia means responsive to lateral movement of said vehicle to render said power means effective to produce graduated operation of said braking means.

14. The combination with a dirigible vehicle, of power actuated means for limiting the movements of the same; and inertia means automatically responsive to lateral movement of said vehicle under predetermined conditions to render said power means automatically effective by a predetermined amount.

15. The combination with a dirigible vehicle having power actuated means for limiting the movements of the same, of inertia means responsive to lateral components of movement of said vehicle; electric means controlled by said inertia means to control said power means whenever the inertia means is subjected to movement of a predetermined character; and means for biasing said inertia means to ineffective position at all times when the vehicle is not subjected to said predetermined character of movement.

16. The combination with a dirigible vehicle having power actuated means for limiting the movements of the same, of inertia means responsive to lateral components of vehicle movement of predetermined character for rendering said power means automatically effective by a predetermined amount; and means for biasing said inertia means to ineffective position at all times when the vehicle is not subjected to said predetermined character of movement.

ALLISON R. WILLIAMS.